United States Patent Office 3,445,389
Patented May 20, 1969

---

3,445,389
SILICONE LUBRICANT
Robert L. McKellar, Midland, Mich., assignor to Dow Corning Corporation, Midland, Mich., a corporation of Michigan
No Drawing. Filed Mar. 29, 1965, Ser. No. 443,631
Int. Cl. C10m 3/44, 1/50; C07f 7/04
U.S. Cl. 252—49.6                          37 Claims

ABSTRACT OF THE DISCLOSURE

A hydrocarbon-silicone copolymer is disclosed in which a diorganopolysiloxane contains some organic radicals having at least 18 carbon atoms, such as $$(CH_3)_3SiO[(CH_3)_2SiO]_{38}[(CH_3)\underset{|}{\overset{C_{18}H_{37}}{Si}}O]_2Si(CH_3)_3$$

Mixtures of the hydrocarbon-silicone copolymers and alkanes are also disclosed. The hydrocarbon-silicone copolymers and the mixtures are useful as lubricants.

---

The present invention relates to a silicone lubricant which is a diorganopolysiloxane wherein some of the organic radicals have at least 18 carbon atoms.

An object of this invention is to provide a silicone lubricant which is compatible with organic lubricants. Another object is to provide an organic lubricant which is compatible with dimethylpolysiloxane fluids. Another object is to provide a silicone lubricant which is a wax. Still another object is to provide a silicone lubricant which reduces friction between fibers and spindles. Other objects and advantages will be apparent from the following detailed description of the present invention.

The present invention relates to a hydrocarbon-silicone copolymer consisting essentially of a copolymer selected from the group consisting of (A) a copolymer of the average formula $$(C_aH_{2a+1})\overset{(CH_3)_2}{\underset{|}{Si}}O-[(CH_3)_2SiO]_b-\overset{(CH_3)_2}{\underset{|}{Si}}(C_aH_{2a+1})$$

in which $a$ has an average value from 18 to 75 inclusive and $b$ has an average value from 0 to 73 inclusive, (B) a copolymer of the average formula $$(C_aH_{2a+1})\overset{(CH_3)_2}{\underset{|}{Si}}O-[(CH_3)_2SiO]_f\overset{(CH_3)_2}{\underset{|}{Si}}-Z-\overset{(CH_3)_2}{\underset{|}{Si}}O[(CH_3)_2SiO]_f-\overset{(CH_3)_2}{\underset{|}{Si}}(C_aH_{2a+1})$$

in which $a$ is defined above, $f$ has an average value from 0 to 10 inclusive and Z is a divalent n-alkylene radical having from 1 to 10 carbon aoms, (C) a copolymer consisting essentially of dimethylsiloxane units, trimethylsiloxane units and units of the formula $$(C_aH_{2a+1})\overset{CH_3}{\underset{|}{Si}}O$$

in which $a$ is defined above, there being an average of two trimethylsiloxane units per molecule, from 2 to 75 dimethylsiloxane units per molecule and an average of at least 2

$$(C_aH_{2a+1})\overset{CH_3}{\underset{|}{Si}}O$$

units per molecule and no more $$(C_aH_{2a+1})\overset{CH_3}{\underset{|}{Si}}O$$

units per 10 siloxane units based on the total number of siloxane units in (C).

The hydrocarbon-silicone copolymer (A) has an average formula $$(C_aH_{2a+1})\overset{(CH_3)_2}{\underset{|}{Si}}O-[(CH_3)_2SiO]_b-\overset{(CH_3)_2}{\underset{|}{Si}}(C_aH_{2a+1})$$

in which $a$ has an average value from 18 to 75 inclusive and $b$ has an average value from 0 to 73 inclusive. The aliphatic radicals can be, for example, any alkyl radical having at least 18 carbon atoms and no more than 75 carbon atoms, such as octadecyl, nonadecyl, eicosyl, heneicosyl, docosyl, tricosyl, tetracosyl, pentacosyl, hexacosyl, heptacosyl, octacosyl, nonacosyl, triacontyl, hentriacontyl, dotriacontyl, tritriacontyl, tetratriacontyl, pentatriacontyl, hexatriacontyl, heptatriacontyl, octatriacontyl, nonatriacontyl, tetracontyl, hentetracontyl, dotetracontyl, tritetracontyl, tetratetracontyl, pentatetracontyl, hexatetracontyl, heptatetracontyl, octatetracontyl, nonatetracontyl, pentacontyl, henpentacontyl, dopentacontyl, tripentacontyl, tetrapentacontyl, pentapentacontyl, hexapentacontyl, heptapentacontyl, octapentacontyl, nonapentacontyl, hexacontyl, henhexacontyl, dohexacontyl, trihexacontyl, tetrahexacontyl, pentahexacontyl, hexahexacontyl, heptahexacontyl, octahexacontyl, nonahexacontyl, heptacontyl, henheptacontyl, doheptacontyl, triheptacontyl, tetraheptacontyl and pentaheptacontyl. These radicals can be either straight chained or branched. The composition can also include alkanes which are the precursor of any of the above alkyl radicals, thus providing mixtures of the hydrocarbon-silicone copolymer and alkanes. These alkanes can be present and are unattached to the silicon atoms. The alkanes have a formula $C_dH_{2d+2}$ wherein $d$ has an average value from 18 to 75 inclusive and thus the value of $a$ is such to include aliphatic radicals bonded directly to a silicon atom, and $d$ is such to include any aliphatic molecules (or alkanes) which are not attached to a silicon atom. These alkanes should not be present in such amounts so as to provide for less than 18 carbon atoms per end silicon atom (or for each $C_aH_{2a+1}$ radical in the copolymer) or more than 100 carbon atoms per end silicon atom (or for each $C_aH_{2a+1}$ radical in the copolymer), thus providing a sum of $a+d$ from 18 to 100. Also the alkanes should not have less than 18 carbon atoms per molecule or more than 75 carbon atoms per molecule. It is understood that there are two alkyl radicals per copolymer, one attached to each terminal silicon atom. The alkanes can be present because the starting ingredients are difficult to purify and even after reaction producing the above copolymers their removal is very difficult therefore as their presence is not detrimental to the final properties of the lubricant, if the limits set forth are maintained, the extra cost involved in purification is an added unnecessary expense. Likewise, all the aliphatic radicals and molecules need not be completely saturated, a small amount of carbon-carbon double bonds can be present, such as not more than 5 percent of the aliphatic radicals and molecules contain double bonds.

If there are fewer carbon atoms in $C_aH_{2a+1}$ than 18, the hydrocarbon-silicone copolymers of the first type (A) are not satisfactory lubricants. If there are more than 100 carbon atoms in $C_aH_{2a+1}$ radicals and $C_dH_{2d+2}$ molecules, the hydrocarbon-silicone copolymers of the first type (A) contain excessive amounts of alkanes and are not satisfactory for this invention.

The silicon-containing portion of the copolymers (A) can contain from 2 to 75 silicon atoms per molecule, thus, the value of $b$ can be from 0 to 73 inclusive. If there are more than 75 silicon atoms per molecule, the lubricants are unsatisfactory for this invention.

The preferred compositions of the hydrocarbon silicone copolymers (A) are those in which $a$ has an average value from 22 to 50 inclusive, and $b$ has an average value from 2 to 30 inclusive, and when alkanes are present the sum of the carbon atoms from the $C_aH_{2a+1}$ radicals and the $C_dH_{2d+2}$ molecules per $C_aH_{2a+1}$ radical is preferably an average value from 22 to 50 inclusive.

An excellent method for preparing copolymers of (A) is to mix

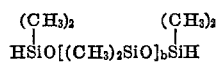

with olefins having terminal double bonds in the presence of a platinum catalyst. The mixture of the siloxane and olefin is usually heated to 70° to 150° C. before the platinum catalyst is added. The platinum catalyst is usually in a solvent such as isopropanol, ethaanol or dimethylphthalate. The amount of platinum catalyst in any conventional form for SiH addition to carbon-carbon double bonds can be a very small amount such as 0.0001 weight percent or as much as 1 weight percent, preferably smaller amounts are used. After the platinum catalyst is added, the mixture is stirred and heated at a temperature from 60° to 160° C. from 10 minutes to 48 hours or until no detachable SiH remains. Other temperatures are operative, but these are preferred. The mixture is usually then purified by mixing with a solvent such as xylene, mixing with diatomaceous earth and charcoal and then filtered. The solvents are removed by heating at reduced pressure.

The second type of hydrocarbon-silocone copolymer is a copolymer (B) having an average formula

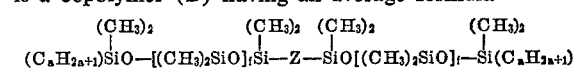

in which $a$ is defined above and $f$ has an average value from 0 to 10 inclusive, preferably $f$ has an average value from 0 to 6 inclusive. The divalent hydrocarbon radical, Z consists essentially of n-alkylenes having from 1 to 10 carbon atoms. Thus, Z can be, for example, methylene, ethylene, propylene, butylene, pentylene, hexylene, heptylene, octylene, nonylene and decylene. Although it is preferred that Z is essentially a straight chain, branched chains in small amounts can be present.

The copolymers (B) can be prepared by reacting 2 moles of

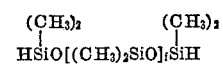

with one mole of a diene such as 1,3-butadiene, 1,4-pentadiene or 1,7-octadiene in the presence of a platinum catalyst as described above. The $C_aH_{2a}$ olefins where $a$ has a value from 18 to 75 are then reacted with the unreacted silicon hydrogen groups to form copolymer (B). When copolymer (B) contains a Z with less than 4 carbon atoms, conventional Grignard reactions are used.

The hydrocarbon-silicone copolymer (C) is a copolymer which consists essentially of dimethylsiloxane units, trimethylsiloxane units and siloxane units of the formula

in which $a$ has an average value from 18 to 75 and there being an average of two trimethylsiloxane units per molecule, from 2 to 75 dimethylsiloxane units per molecule and there being an average of at least two

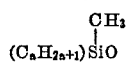

units per molecule and no more than four

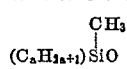

units per 10 siloxane units based on the total number of siloxane units in (C). Preferably, the hydrocarbon-silicone copolymer (C) contains 2 to 50 dimethylsiloxane units per molecule, no more than three

units per 10 siloxane units and $a$ has an average value from 22 to 50 inclusive. Alkanes can be present with the (B) and (C) copolymers as defined in (A) to provide mixtures.

The hydrocarbon-silicone copolymers (C) can be made by reacting siloxanes of a formula

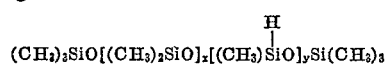

with olefins of the formula $C_aH_{2a}$ in the presence of a platinum catalyst as described above. The $(CH_3)_2SiO$ units and $(CH_3)HSiO$ units can be anywhere along the polymer chain. These siloxanes which contain silicon-bonded hydrogens can be prepared by equilibrating dimethylpolysiloxanes such as octamethylcyclotetrasiloxane with

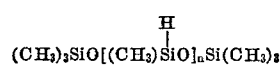

where $n$ has an average value from 5 to 40 in the presence of an acid catalyst such as sulfuric acid. The equilibration method is a conventional method and the dimethylpolysiloxanes and the methylhydrogen polysiloxane are well known in the art and can be obtained commercially. The ratio of dimethylsiloxane units to

units can be controlled by the proportions of the initial ingredients used.

The hydrocarbon-silicone copolymers of this invention are particularly useful as lubricants and are particularly useful as lubricants for fibers. These lubricants are compatible with organic lubricants and are also compatible witth dimethylpolysiloxane fluids. The general compatability of these hydrocarbon-silicone copolymers makes them particularly useful in that they can be used with conventional organic lubricants and provide better and longer lasting lubrication on fibers. The hydrocarbon-silicone copolymers are waxy materials and some are waxy solids at room temperature. These hydrocarbon-silicone copolymers can be applied to fibers by conventional techniques, such as passing the fiber through a solution, passing the fiber through a liquid hydrocarbon-silicone copolymer bath, or running the fiber over a hydrocarbon-silicone copolymer which is a solid. Any fiber can be so lubricated, such as yarn or thread made of wool, rayon, hemp, silk, polyesters, polyamides and polypropylene. The hydrocarbon-silicone copolymers reduce the friction between the fibers and the spindles and also between fiber and fiber. The reduction in friction is greater than most conventional lubricants.

The hydrocarbon-silicone copolymers will also provide lubrication in places where conventional lubricants are used.

The following examples are illustrative only and should not be construed as limiting the invention which is properly delineaated in the appended claims.

EXAMPLE 1

A hydrocarbon-silicone copolymer was prepared by mixing three drops of a solution of one weight percent chloroplatinic acid in ethanol and 188.5 g. of an alpha-olefin mixture consisting of alkenes having 20 carbon atoms or more and alkanes having 20 carbon atoms or more where the alkenes represented about 70 weight percent of the alpha-olefin mixture. This mixture was heated to 110° C. in a one-liter, three-necked flask equipped with a reflux condenser, thermometer and a mechanical stirrer. To the heated solution, 30.1 g. of a mixture of toluene and 20.5 g. of a dimethylpolysiloxane having two terminal silicon-bonded hydrogen atoms and having an average of 8 silicon atoms per molecule was added dropwise. The addition required 0.5 hours. The mixture was then heated to 145° C. for 24 hours. The mixture was then stripped to 200° C. at 1.0 mm. Hg. The product was a waxy solid melting at 48° C. and was a mixture of a siloxane of the average formula $$(C_aH_{2a+1})\overset{(CH_3)_2}{\underset{|}{Si}}O-[(CH_3)_2SiO]_6-\overset{(CH_3)_2}{\underset{|}{Si}}(C_aH_{2a+1})$$

plus alkanes in which the sum of the carbon atoms of the $C_aH_{2a+1}$ radicals and the alkanes per $C_aH_{2a+1}$ radical was 61.

EXAMPLE 2

A hydrocarbon-silicone copolymer was prepared by melting 124.6 g. of an alpha-olefin mixture consisting of alkenes having 20 carbon atoms or more and alkanes having 20 carbon atoms or more where the alkenes represented about 70 weight percent of the alpha-olefin mixture. Three drops of a solution of one weight percent chloroplatinic acid in ethanol was added. The mixture was heated to 110° C. To the heated mixture, 50.2 g. of the dimethylpolysiloxane mixture of Example 1 was added dropwise at a rate sufficient to maintain the temperature of the mixture at 110° C. The mixture was then heated to 144° C. for 24 hours with stirring. The mixture was then stripped to 210° C. at 1.0 mm. Hg. The product was a waxy solid at room temperature with a melting point of 54° C. and was a mixture of a siloxane of the average formula of $$(C_aH_{2a+1})\overset{(CH_3)_2}{\underset{|}{Si}}O-[(CH_3)_2SiO]_6-\overset{(CH_3)_2}{\underset{|}{Si}}(C_aH_{2a+1})$$

plus alkanes in which the sum of the carbon atoms of the $C_aH_{2a+1}$ radicals and the alkanes per $C_aH_{2a+1}$ radical was 40.

EXAMPLE 3

A hydrocarbon-silicone copolymer was prepared by mixing three drops of a solution of one weight percent chloroplatinic acid in ethanol and 188.5 g. of an alpha-olefin mixture consisting of alkenes and alkanes both having 20 or more carbon atoms per molecule where the alkenes represented about 70 weight percent of the alpha-olefin mixture. This mixture was heated to 110° C. and then tetramethyldihydrogendisiloxane was added at a sufficient rate to maintain the temperature at 110° C. After the addition the mixture was heated at 150° C. for 2 hours. The resulting mixture was then stripped at 180° C. at 1.0 mm. Hg. The product was a waxy solid at room temperature and melted at 55° C. and was a mixture of a siloxane of the average formula of $$(C_aH_{2a+1})\overset{(CH_3)_2}{\underset{|}{Si}}O-\overset{(CH_3)_2}{\underset{|}{Si}}(C_aH_{2a+1})$$

plus alkanes in which the sum of the carbon atoms of the $C_aH_{2a+1}$ radicals and the alkanes per $C_aH_{2a+1}$ radical was 61.

EXAMPLE 4

A mixture of 55.4 g. of octadecene, 145.3 g. of a siloxane of the average formula $$(CH_3)_3SiO[(CH_3)_2SiO]_{28}[(CH_3)\overset{H}{\underset{|}{Si}}O]_2Si(CH_3)_3$$

and 50 g. of xylene was heated to 80° C. and then 7 drops of a solution of 2 weight percent chloroplatinic acid in isopropanol was added resulting in a temperature increase to 103° C. The mixture was then heated overnight at 75° C. The product was stripped to 85° C. at about 1.0 mm. Hg. The product was a golden yellow fluid with a freezing point of −17.8° C., a viscosity of 52 cs. at 25° C. and a refractive index of 1.4219 at 25° C.

EXAMPLE 5

A hydrocarbon-silicone copolymer was prepared by mixing 246 g. of a polysiloxane of the average formula $$H\overset{(CH_3)_2}{\underset{|}{Si}}O[(CH_3)_2SiO]_{31}\overset{(CH_3)_2}{\underset{|}{Si}}H$$

and 115 g. of an alpha-olefin mixture consisting of alkenes and alkanes both having 20 carbon atoms or more per molecule where the alkenes represented about 70 weight percent of the alpha-olefin mixture in a 1-liter-3-neck flask equipped with a reflux condenser, thermometer and a mechanical stirrer. The mixture was heated to 80° C. and then 20 drops of a solution of 2 weight percent chloroplatinic acid in isopropanol was added resulting in a temperature increase to 101° C. The mixture was then stripped to 115° C. at 8 mm. of Hg and then filtered while hot. The product was a waxy solid at room temperature of a mixture of a siloxane of the average formula $$(C_aH_{2a+1})\overset{(CH_3)_2}{\underset{|}{Si}}O-[(CH_3)_2SiO]_{31}-\overset{(CH_3)_2}{\underset{|}{Si}}(C_aH_{2a+1})$$

plus alkanes in which the sum of the carbon atoms of the $C_aH_{2a+1}$ radicals and the alkanes per $C_aH_{2a+1}$ radical was 41.

EXAMPLE 6

A mixture of 132 g. of a polysiloxane of the average formula $$(CH_3)_3SiO[(CH_3)_2SiO]_6[(CH_3)\overset{H}{\underset{|}{Si}}O]_2Si(CH_3)_3$$

372 g. of an alpha-olefin mixture consisting of alkenes and alkanes, both having 22 carbon atoms or more per molecule where 70 weight percent was alkenes and 40 drops of a solution of 2 weight percent chloroplatinic acid in isopropanol was heated to 80° C. and then allowed to stir overnight at 70° C. The mixture was filtered while hot and then stripped to 110° C. at about 1.0 mm. Hg. A wax was formed having a melting point of 52° C. and was a mixture of a siloxane of the average formula of $$(CH_3)_3SiO[(CH_3)_2SiO]_6[(CH_3)\overset{(C_aH_{2a+1})}{\underset{|}{Si}}O]_2Si(CH_3)_3$$

plus alkanes, in which the sum of the carbon atoms of the $C_aH_{2a+1}$ radicals aind the alkanes per $C_aH_{2a+1}$ radical was 88.

EXAMPLE 7

A mixture of 145.8 g. of the dimethylpolysiloxane of Example 1 and 144 g. of the alpha-olefin mixture of Example 1 was heated with agitation to 110° C. and then 2 drops of a solution of 1 weight percent chloroplatinic acid in ethanol was added. The temperature increased to 170° C. The temperature was reduced to 144° C. and maintained at this temperature for 24 hours. The mixture was then fitlered while hot. The product was a wax melting at 44° C. and was a mixture of a siloxane of the average formula of $$(C_aH_{2a+1})\overset{(CH_3)_2}{\underset{|}{Si}}O-[(CH_3)_2Si]_6-\overset{(CH_3)_2}{\underset{|}{Si}}(C_aH_{2a+1})$$

plus alkanes in which the sum of the carbon atoms of the $C_aH_{2a+1}$ radicals and the alkanes per $C_aH_{2a+1}$ radical was 45.

EXAMPLE 8

A polymer of the average formula $$(CH_3)_2 \quad (CH_3)_2 \quad (CH_3)_2 \quad (CH_3)_2$$
$$H\overset{|}{S}iO[(CH_3)_2SiO]_6\overset{|}{S}i\text{—}(CH_2)_8\text{—}\overset{|}{S}iO[(CH_3)_2SiO]_6\overset{|}{S}iH$$

was prepared by heating 533.2 g. of $$(CH_3)_2 \quad (CH_3)_2$$
$$H\overset{|}{S}iO[(CH_3)_2SiO]_6\overset{|}{S}iH$$

to 65° C. and then adding 3 drops of a solution of chloroplatinic acid in ethanol. To this solution, 55 g. of 1,7-octadiene was added dropwise over a period of 0.5 hour. At the end of the octadiene addition, the mixture was heated to 100° C. for 2 hours and was then filtered. The product copolymer mixture had a melting point of 46° C. and an average formula of $$(CH_3)_2 \quad (CH_3)_2 \quad (CH_3)_2 \quad (CH_3)_2$$
$$(C_aH_{2a+1})\overset{|}{S}iO\text{—}[(CH_3)_2SiO]_6\overset{|}{S}i(CH_2)_8\overset{|}{S}iO\text{—}[(CH_3)_2SiO]\text{—}\overset{|}{S}i(C_aH_{2a+1})$$

plus alkanes in which the sum of the carbon atoms of the $C_aH_{2a+1}$ radicals and the alkanes per $C_aH_{2a+1}$ radical was 58.

EXAMPLE 9

When 1 mole of the following siloxanes and 2 moles of the alpha-olefins are reacted by the procedure of Example 1, hydrocarbon-silicone copolymers are obtained.

| Siloxane | Alpha-olefin | Hydrocarbon-silicone copolymer |
|---|---|---|
| $(CH_3)_2 \quad (CH_3)_2$ <br> $H\overset{|}{S}iO[(CH_3)_2SiO]_{50}\overset{|}{S}iH$ | 1-octadecene | $(CH_3)_2 \quad (CH_3)_2$ <br> $(C_{18}H_{37})\overset{|}{S}iO[(CH_3)_2SiO]_{50}\overset{|}{S}i(C_{18}H_{37})$ |
| $(CH_3)_2 \quad CH_3$ <br> $H\overset{|}{S}iO[(CH_3)_2SiO]_{73}\overset{|}{S}iH$ | 1-pentaheptacontene | $(CH_3)_2 \quad (CH_3)_2$ <br> $(C_{75}H_{151})\overset{|}{S}iO[(CH_3)_2SiO]_{73}\overset{|}{S}i(C_{75}H_{151})$ |
| $(CH_3)_2 \quad (CH_3)_2$ <br> $H\overset{|}{S}iO[(CH_3)_2SiO]_{20}\overset{|}{S}iH$ | 2 moles of 1-hexacontene and 2 moles of tetracontane. | $(CH_3)_2 \quad (CH_3)_2$ <br> $(C_{60}H_{121})\overset{|}{S}iO\text{—}[(CH_3)_2SiO]_{20}\text{—}\overset{|}{S}i(C_{60}H_{121})$ <br> plus two moles of $C_{40}H_{82}$. |
| $(CH_3)_2 \quad (CH_3)_2$ <br> $H\overset{|}{S}iO[(CH_3)_2SiO]\overset{|}{S}iH$ | 1-docosene | $(CH_3)_2 \quad (CH_3)_2$ <br> $(C_{22}H_{45})\overset{|}{S}iO[(CH_3)_2SiO]\overset{|}{S}i(C_{22}H_{45})$ | was stripped to 185° C. at 2.5 mm. Hg for 10 minutes.

163.7 g. of the alpha-olefin mixture of Example 6 was heated to 112° C. and 20 drops of a solution of 2 weight percent chloroplatinic acid in isopropanol was added. 126.7 g. of the above polymer was added dropwise over a period of 0.5 hour. The mixture was heated for an additional 3 hours and then 10 g. of charcoal was added. The product was then filtered. The hydrocarbon-silicone

EXAMPLE 10

When 1 mole of the following siloxanes are reacted with 2 moles of the alpha-olefins by the procedure of Example 8, hydrocarbon-silicone copolymers are obtained.

| Siloxane | Alpha-olefin | Hydrocarbon-silicone copolymer |
|---|---|---|
| $(CH_3)_2 \quad (CH_3)_2 \quad (CH_3)_2 \quad (CH_3)_2$ <br> $H\overset{|}{S}i\text{—}O\text{—}\overset{|}{S}i\text{—}CH_2\text{—}\overset{|}{S}i\text{—}O\text{—}\overset{|}{S}iH$ | 1-octadecene | $(CH_3)_2 \quad (CH_3)_2 \quad (CH_3)_2 \quad (CH_3)_2$ <br> $(C_{18}H_{37})\overset{|}{S}i\text{—}O\text{—}\overset{|}{S}i\text{—}CH_2\text{—}\overset{|}{S}i\text{—}O\text{—}\overset{|}{S}i(C_{18}H_{37})$ |
| $(CH_3)_2 \quad (CH_3)_2$ <br> $H\overset{|}{S}iO[(CH_3)_2SiO]_6\overset{|}{S}i(CH_2)_{10}$ <br> $(CH_3)_2 \quad (CH_3)_2$ <br> $\overset{|}{S}iO[(CH_3)_2SiO]_6\overset{|}{S}iH$ | 1-docosene | $(CH_3)_2 \quad (CH_3)_2$ <br> $(C_{22}H_{45})\overset{|}{S}iO[(CH_3)_2SiO]_6\overset{|}{S}i(CH_2)_{10}$ <br> $(CH_3)_2 \quad (CH_3)_2$ <br> $\overset{|}{S}iO[(CH_3)_2SiO]_6\overset{|}{S}i(C_{22}H_{45})$ |
| $(CH_3)_2 \quad (CH_3)_2$ <br> $H\overset{|}{S}iO[(CH_3)_2SiO]_4\overset{|}{S}i(CH_2)_4$ <br> $(CH_3)_2 \quad (CH_3)_2$ <br> $\overset{|}{S}iO[(CH_3)_2SiO]_4\overset{|}{S}iH$ | 1-triacontene | $(CH_3)_2 \quad (CH_3)_2$ <br> $(C_{30}H_{61})\overset{|}{S}iO[(CH_3)_2SiO]_4\overset{|}{S}i(CH_2)_4$ <br> $(CH_3)_2 \quad (CH_3)_2$ <br> $\overset{|}{S}iO[(CH_3)_2SiO]_4\overset{|}{S}i(C_{30}H_{61})$ |
| $(CH_3)_2 \quad (CH_3)_2$ <br> $H\overset{|}{S}iO[(CH_3)_2SiO]_{10}\overset{|}{S}i(CH_2)_6$ <br> $(CH_3)_2 \quad (CH_3)_2$ <br> $\overset{|}{S}iO[(CH_3)_2SiO]_{10}\overset{|}{S}iH$ | 1-pentaheptacontene | $(CH_3)_2 \quad (CH_3)_2$ <br> $(C_{75}H_{151})\overset{|}{S}iO[(CH_3)_2SiO]_{10}\overset{|}{S}i(CH_2)_6$ <br> $(CH_3)_2 \quad (CH_3)_2$ <br> $\overset{|}{S}iO[(CH_3)_2SiO]_{10}\overset{|}{S}i(C_{75}H_{151})$ |
| $(CH_3)_2 \quad (CH_3)_2$ <br> $H\overset{|}{S}iO[(CH_3)_2SiO]_6\overset{|}{S}i(CH_2)_8$ <br> $(CH_3)_2 \quad (CH_3)_2$ <br> $\overset{|}{S}iO[(CH_3)_2SiO]_6\overset{|}{S}iH$ | 1 mole of 1-dotetracontene, 1 mole of 1-heptatricontene, 1 mole of octapentacontane, and 1 mole of trihexacontane. | $(CH_3)_2 \quad (CH_3)_2$ <br> $(C_{39.5}H_{80})\overset{|}{S}iO\text{—}[(CH_3)_2SiO]_6\overset{|}{S}i(CH_2)_8$ <br> $(CH_3)_2 \quad (CH_3)_2$ <br> $\overset{|}{S}iO[(CH_3)_2SiO]_6\overset{|}{S}i(C_{39.5}H_{80})$ <br> plus 1 mole of $C_{58}H_{118}$ and 1 mole of $C_{63}H_{128}$. |

EXAMPLE 11

When one mole of the following siloxanes are reacted with the alpha-olefins by the procedure of Example 4, hydrocarbon-siloxanes are obtained.

| Siloxane | Alpha-olefin | Hydrocarbon-silicone copolymer |
|---|---|---|
| $(CH_3)_3SiO[(CH_3)_2SiO]_{50}[(CH_3)SiO]_{22}Si(CH_3)_3$ with H on the $(CH_3)SiO$ unit | 22 moles of 1-triacontene | $(CH_3)_3SiO[(CH_3)_2SiO]_{50}[(CH_3)SiO]_{22}Si(CH_3)_3$ with $(C_{30}H_{61})$ on the $(CH_3)SiO$ unit |
| $(CH_3)_3SiO[(CH_3)_2SiO]_{75}[(CH_3)SiO]_{51}Si(CH_3)_3$ with H | 51 moles of 1-docosene | $(CH_3)_3SiO[(CH_3)_2SiO]_{75}[(CH_3)SiO]_{51}Si(CH_3)_3$ with $(C_{22}H_{45})$ |
| $(CH_3)_3SiO[(CH_3)_2SiO]_2[(CH_3)SiO]_2Si(CH_3)_3$ with H | 2 moles of 1-tripentacontene | $(CH_3)_3SiO[(CH_3)_2SiO]_2[(CH_3)SiO]_2Si(CH_3)_3$ with $(C_{53}H_{107})$ |
| $(CH_3)_3SiO[(CH_3)_2SiO]_{34}[(CH_3)SiO]_4Si(CH_3)_3$ with H | 2 moles of 1-nonacosene and 2 moles of 1-pentacosene. | $(CH_3)_3SiO[(CH_3)_2SiO]_{34}[(CH_3)SiO]_4Si(CH_3)_3$ with $(C_{27}H_{55})$ |
| $(CH_3)_3SiOSiO[(CH_3)_2SiO]_4SiOSi(CH_3)_3$ with H and CH₃ substituents | 2 moles of 1-pentaheptacontene | $(CH_3)_3SiOSiO[(CH_3)_2SiO]_4SiOSi(CH_3)_3$ with $(C_{75}H_{151})$ and CH₃ substituents |
| $(CH_3)_3SiO[(CH_3)_2SiO]_{10}[(CH_3)SiO]_3Si(CH_3)_3$ with H | 0.5 mole each of: 1-octadecene, 1-nonadecene, 1-eicosene, 1-docosene, 1-tetraacosene, and 1-octacosene. | $(CH_3)_3SiO[(CH_3)_2SiO]_{10}[(CH_3)SiO]_3Si(CH_3)_3$ with $(C_{22}H_{45})$ |
| $(CH_3)_3SiOSiO[(CH_3)_2SiO]_{55}SiOSi(CH_3)_3$ with H and CH₃ | 0.1 mole each of: 1-tetratriacontene, 1-octacosene, 1-tetracosene, 1-tetracontene, 1-nonatetracontene, 1-heptapentacontene, 1-hexacontene, 1-octahexacontene, 1-dotriacontene, 1-docosene, henpentacontane, 10-hexatetracontene, octapentacontane and 4-octatetracontene. 0.2 mole each of: henheptacontane, pentahexacontane, octapentacontane, triphentacontane and hexatetracontane, 1-pentapentacontene, 1-heptatetracontene, 1-octacosens, 1-codosene and 1-pentacontene. 0.3 mole each of nonahexacontane and dohexacontane. | $(CH_3)_3SiOSiO[(CH_3)_2SiO]_{55}SiOSi(CH_3)_3$ with $(C_{40.9}H_{82.8})$ and CH₃ plus 0.1 mole $C_{51}H_{104}$, 0.3 mole $C_{55}H_{118}$, 0.2 mole $C_{17}H_{144}$, 0.2 mole $C_{65}H_{132}$, 0.2 mole $C_{53}H_{108}$, 0.2 mole $C_{46}H_{94}$, 0.3 mole $C_{69}H_{140}$ and 0.3 mole $C_{62}H_{126}$. |

That which is claimed is:

1. A hydrocarbon-silicone copolymer consisting essentially of a copolymer selected from the group consisting of:

(A) a copolymer of the average formula $$(C_aH_{2a+1})\overset{(CH_3)_2}{\underset{}{Si}}O-\{(CH_3)_2SiO\}_b-\overset{(CH_3)_2}{\underset{}{Si}}(C_aH_{2a+1})$$

in which $a$ has an average value from 18 to 75 inclusive, and $b$ has an average value from 0 to 73 inclusive, (B) a copolymer of the average formula $$(C_aH_{2a+1})\overset{(CH_3)_2}{\underset{}{Si}}O-\{(CH_3)_2SiO\}_f\overset{(CH_3)_2}{\underset{}{Si}}-Z-\overset{(CH_3)_2}{\underset{}{Si}}\{(OH_3)_2SiO\}_f\overset{(CH_3)_2}{\underset{}{Si}}(C_aH_{2a+1})$$

in which $a$ is defined above, $f$ has an average value from 0 to 10 inclusive and Z is a n-alkylene having from 1 to 10 inclusive carbon atoms, and (C) a copolymer consisting essentially of dimethylsiloxane units, trimethylsiloxane units and units of the formula $$(C_aH_{2a+1})\overset{CH_3}{\underset{}{Si}}O$$

in which $a$ is defined above, there being an average of two trimethylsiloxane units per molecule, from 2 to 75 dimethylsiloxane units per molecule and an average of at least 2

$$(C_aH_{2a+1})\overset{CH_3}{\underset{}{Si}}O$$

units per molecule and no more than 4

$$(C_aH_{2a+1})\overset{CH_3}{\underset{}{Si}}O$$

units per 10 siloxane units based on the total number of siloxane units in (C).

2. A hydrocarbon-silicone copolymer consisting essentially of a copolymer of the average formula $$(C_aH_{2a+1})\overset{(CH_3)_2}{\underset{}{Si}}O-\{(CH_3)_2SiO\}_b-\overset{(CH_3)_2}{\underset{}{Si}}(C_aH_{2a+1})$$

in which $a$ has an average value from 18 to 75 inclusive, and $b$ has an average value from 0 to 73 inclusive.

3. The hydrocarbon-silicone copolymer of claim 2 in which $a$ has an average value from 22 to 50 inclusive.

4. The hydrocarbon-silicone copolymer of claim 2 in which $b$ has an average value from 2 to 30 inclusive.

5. The hydrocarbon-silicone copolymer of claim 3 in which $b$ has an average value from 2 to 30 inclusive.

6. The hydrocarbon-silicone copolymer of claim 2 in which $a$ has an average value from 22 to 50 inclusive and $b$ has an average value from 4 to 10 inclusive.

7. A hydrocarbon-silicone copolymer consisting essentially of a copolymer of the average formula $$(C_aH_{2a+1})\overset{(CH_3)_2}{\underset{}{Si}}O-\{(CH_3)_2SiO\}_f\overset{(CH_3)_2}{\underset{}{Si}}-Z-\overset{(CH_3)_2}{\underset{}{Si}}\{(CH_3)_2SiO\}_f\overset{(CH_3)_2}{\underset{}{Si}}(C_aH_{2a+1})$$

in which $a$ has an average value from 18 to 75 inclusive, $f$ has an average value from 0 to 10 inclusive and Z is a n-alkylene having from 1 to 10 inclusive carbon atoms.

8. The hydrocarbon-silicone copolymer of claim 7 in which $a$ has an average value from 22 to 50 inclusive.

9. The hydrocarbon-silicone copolymer of claim 7 in which $f$ has an average value from 0 to 6 inclusive.

10. The hydrocarbon-silicone copolymer of claim 8 in which $f$ has an average value from 0 to 6 inclusive.

11. A hydrocarbon-silicone copolymer consisting essentially of dimethylsiloxane units, a trimethylsiloxane units and units of the formula $$(C_aH_{2a+1})\overset{CH_3}{\underset{}{Si}}O$$

in which $a$ has an average value from 18 to 75 inclusive, there being an average of two trimethylsiloxane units per molecule, from 2 to 75 dimethylsiloxane units per molecule and an average of at least 2

$$(C_aH_{2a+1})\overset{CH_3}{\underset{}{Si}}O$$

units per molecule and no more than 4

$$(C_aH_{2a+1})\overset{CH_3}{\underset{}{Si}}O$$

units per 10 siloxane units based on the total number of siloxane units.

12. The hydrocarbon-silicone copolymer of claim 11 in which $a$ has an average from 22 to 50 inclusive.

13. The hydrocarbon-silicone copolymer of claim 11 in which there is present from 2 to 50 dimethylsiloxane units per molecule.

14. The hydrocarbon-silicone copolymer of claim 12 in which there is present from 2 to 50 dimethylsiloxane units per molecule.

15. The hydrocarbon-silicone copolymer of claim 12 in which there is no more than 3

$$(C_aH_{2a+1})\underset{\underset{CH_3}{|}}{Si}O$$

units per 10 siloxane units based on the total number of siloxane units.

16. The hydrocarbon-silicone copolymer of claim 14 in which there is no more than 3

$$(C_aH_{2a+1})\underset{\underset{CH_3}{|}}{Si}O$$

units per 10 siloxane units based on the total number of siloxane units.

17. A hydrocarbon-silicone copolymer consisting of a copolymer of the formula $$(CH_3)_3SiO\underset{\underset{CH_3}{|}}{\overset{\overset{(C_aH_{2a+1})}{|}}{Si}}O\{(CH_3)_2SiO)\}_x-\underset{\underset{CH_3}{|}}{\overset{\overset{(C_aH_{2a+1})}{|}}{Si}}OSi(CH_3)_3$$

in which $a$ has an average value from 22 to 50 inclusive and $x$ has an average value from 2 to 50 inclusive.

18. A mixture of a hydrocarbon-silicone copolymer consisting essentially of a copolymer selected from the group consisting of
(A) a copolymer of the average formula $$(C_aH_{2a+1})\overset{\overset{(CH_3)_2}{|}}{Si}O-\{(CH_3)_2SiO\}_b-\overset{\overset{(CH_3)_2}{|}}{Si}(C_aH_{2a+1})$$

in which $a$ has an average value from 18 to 75 inclusive and $b$ has an average value from 0 to 73 inclusive,
(B) a copolymer of the average formula $$(C_aH_{2a+1})\overset{\overset{(CH_3)_2}{|}}{Si}O-\{(CH_3)_2SiO\}_f\overset{\overset{(CH_3)_2}{|}}{Si}-Z-\overset{\overset{(CH_3)_2}{|}}{Si}O\{(CH_3)_2SiO\}_f\overset{\overset{(CH_3)_2}{|}}{Si}(C_aH_{2a+1})$$

in which $a$ is defined above, $f$ has an average value from 0 to 10 inclusive and Z is a n-alkylene having from 1 to 10 inclusive carbon atoms, and
(C) a copolymer consisting essentially of dimethylsiloxane units, trimethylsiloxane units and units of the formula $$(C_aH_{2a+1})\underset{\underset{CH_3}{|}}{Si}O$$

in which $a$ is defined above, there being an average of two trimethylsiloxane units per molecule, from 2 to 75 dimethylsiloxane units per molecule and an average of at least 2

$$(C_aH_{2a+1})\underset{\underset{CH_3}{|}}{Si}O$$

units per molecule and no more than 4

$$(C_aH_{2a+1})\underset{\underset{CH_3}{|}}{Si}O$$

units per 10 siloxane units based on the total number of siloxane units in (C),
and alkanes of the formula $C_dH_{2d+2}$ wherein $d$ has an average value from 18 to 75, there being from 18 to 100 carbon atoms from the sum of the $C_aH_{2a+1}$ radicals and the $C_dH_{2d+2}$ molecules for each $C_aH_{2a+1}$ radical in the copolymer.

19. A mixture of a hydrocarbon-silicone copolymer consisting essentially of a copolymer of the average formula $$(C_aH_{2a+1})\overset{\overset{(CH_3)_2}{|}}{Si}O-\{(CH_3)_2SiO\}_b\overset{\overset{(CH_3)_2}{|}}{Si}(C_aH_{2a+1})$$

in which $a$ has an average value from 18 to 75 inclusive, and $b$ has an average value from 0 to 73 inclusive, and alkanes of the formula $C_dH_{2d+2}$ wherein $d$ has an average value from 18 to 75, there being from 18 to 100 carbon atoms from the sum of the $C_aH_{2a+1}$ radicals and the $C_dH_{2d+2}$ molecules for each $C_aH_{2a+1}$ radical in the copolymer.

20. The mixture of claim 19 in which there are from 18 to 75 carbon atoms from the sum of the $C_aH_{2a+1}$ radicals and the $C_dH_{2d+2}$ molecules for each $C_aH_{2a+1}$ radical in the copolymer.

21. The mixture of claim 19 in which there are from 22 to 50 carbon atoms from the sum of the $C_aH_{2a+1}$ radicals and the $C_dH_{2d+2}$ molecules for each $C_aH_{2a+1}$ radical in the copolymer.

22. The mixture of claim 20 in which $b$ has an average value from 2 to 30 inclusive.

23. The mixture of claim 21 in which $b$ has an average value from 2 to 30 inclusive.

24. The mixture of claim 19 in which $a$ has an average value from 22 to 50 inclusive, $b$ has an average value from 4 to 10 inclusive, and there are from 22 to 50 carbon atoms from the sum of the $C_aH_{2a+1}$ radicals and the $C_dH_{2d+2}$ molecules for each $C_aH_{2a+1}$ radical in the copolymer.

25. A mixture of a hydrocarbon-silicone copolymer consisting essentially of a copolymer of the average formula $$(C_aH_{2a+1})\overset{\overset{(CH_3)_2}{|}}{Si}O-\{(CH_3)_2SiO\}_f\overset{\overset{(CH_3)_2}{|}}{Si}-Z-\overset{\overset{(CH_3)_2}{|}}{Si}O\{(CH_3)_2SiO\}_f\overset{\overset{(CH_3)_2}{|}}{Si}(C_aH_{2a+1})$$

in which $a$ has an average value from 18 to 75 inclusive, $f$ has an average value from 0 to 10 inclusive and Z is a n-alkylene having from 1 to 10 inclusive carbon atoms, and alkanes of the formula $C_dH_{2d+2}$ wherein $d$ has an average value from 18 to 75 inclusive, there being from 18 to 100 inclusive carbon atoms from the sum of the $C_aH_{2a+1}$ radicals and the $C_dH_{2d+2}$ molecules for each $C_aH_{2a+1}$ radical in the copolymer.

26. The mixture of claim 25 in which there are from 18 to 75 inclusive carbon atoms from the sum of the $C_aH_{2a+1}$ radicals and the $C_dH_{2d+2}$ molecules for each $C_aH_{2a+1}$ radical in the copolymer.

27. The mixture of claim 25 in which there are from 22 to 50 inclusive carbon atoms from the sum of the $C_aH_{2a+1}$ radicals and the $C_dH_{2d+2}$ molecules for each $C_aH_{2a+1}$ radical in the copolymer.

28. The mixture of claim 26 in which $f$ has an average value from 0 to 6 inclusive.

29. The mixture of claim 27 in which $f$ has an average value from 0 to 6 inclusive.

30. A mixture of a hydrocarbon-silicone copolymer consisting essentially of dimethylsiloxane units, trimethylsiloxane units and units of the formula $$(C_aH_{2a+1})\underset{\underset{CH_3}{|}}{Si}O$$

in which $a$ has an average value from 18 to 75 inclusive, there being an average of two trimethylsiloxane units per molecule, from 2 to 75 dimethylsiloxane units per molecule and an average of at least 2

$$(C_aH_{2a+1})\underset{\underset{CH_3}{|}}{Si}O$$

units per molecule and no more than 4

$$(C_aH_{2a+1})\underset{\underset{CH_3}{|}}{Si}O$$

units per 10 siloxane units based on the total number of siloxane units, and alkanes of the formula $C_dH_{2d+2}$ in which $d$ has an average value from 18 to 75 inclusive and there being from 18 to 100 inclusive carbon atoms from the sum of $C_aH_{2a+1}$ radicals and the $C_dH_{2d+2}$ molecules for each $C_aH_{2a+1}$ radical in the copolymer.

31. The mixture of claim 30 in which there are from 18 to 75 inclusive carbon atoms from the sum of the $C_aH_{2a+1}$ radicals and the $C_dH_{2d+2}$ molecules for each $C_aH_{2a+1}$ radical in the copolymer.

32. The mixture of claim 30 in which there are from 22 to 50 inclusive carbon atoms from the sum of the $C_aH_{2a+1}$ radicals and the $C_dH_{2d+2}$ molecules for each $C_aH_{2a+1}$ radical in the copolymer.

33. The mixture of claim 31 in which there is present from 2 to 50 dimethylsiloxane units per molecule.

34. The mixture of claim 52 in which there is present from 2 to 50 dimethylsiloxane units per molecule.

35. The mixture of claim 33 in which there is no more than 3

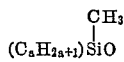

units per 10 siloxane units based on the total number of siloxane units.

36. The mixture of claim 34 in which there is no more than 3

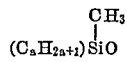

units per 10 siloxane units based on the total number of siloxane units.

37. A mixture of a hydrocarbon-silicone copolymer consisting of a copolymer of the formula

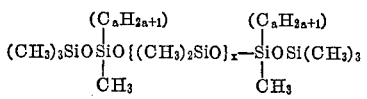

in which $a$ has an average value from 22 to 50 inclusive, and $x$ has an average value from 2 to 50 inclusive, and alkanes of the formula $C_dH_{2d+2}$ in which $d$ has an average value from 22 to 50 inclusive and there being from 22 to 50 inclusive carbon atoms from the sum of the $C_aH_{2a+1}$ radicals and the $C_dH_{2d+2}$ molecules for each $C_aH_{2a+1}$ radical in the copolymer.

References Cited

UNITED STATES PATENTS

| | | | |
|---|---|---|---|
| 2,644,802 | 7/1953 | Lontz | 260—29.1 XR |
| 2,934,515 | 4/1960 | Konkle et al. | 260—45.5 XR |
| 2,959,569 | 11/1960 | Warrick | 260—46.5 XR |
| 2,970,150 | 1/1961 | Bailey | 260—348 XR |
| 2,988,473 | 6/1961 | Mallis et al. | 167—27 XR |
| 3,159,662 | 12/1964 | Ashby | 260—448.2 |
| 3,198,766 | 8/1965 | Nitzsche et al. | 260—448.2 X |
| 3,296,291 | 1/1967 | Chalk et al. | 260—448.2 |

DANIEL E. WYMAN, *Primary Examiner.*

W. CANNON, *Assistant Examiner.*

U.S. Cl. X.R.

260—448.2